UNITED STATES PATENT OFFICE.

CARLETON ELLIS, OF MONTCLAIR, NEW JERSEY, AND MORTIMER J. COHEN, OF NEW YORK, N. Y., ASSIGNORS, BY MESNE ASSIGNMENTS, TO SETH B. HUNT, TRUSTEE, OF MOUNT KISCO, NEW YORK.

PROCESS OF SEPARATING ALCOHOLS AND HYDROCARBONS.

1,365,048.   Specification of Letters Patent.   Patented Jan. 11, 1921.

No Drawing.   Application filed April 25, 1918. Serial No. 230,684.

*To all whom it may concern:*

Be it known that we, CARLETON ELLIS and MORTIMER J. COHEN, citizens of the United States, and residents of Montclair, county of Essex, and State of New Jersey, and New York, county of New York, and State of New York, respectively, have invented certain new and useful Improvements in Processes of Separating Alcohols and Hydrocarbons, of which the following is a specification.

This invention relates to a process of effecting substantial separation of alcoholic material from hydrocarbon material.

When alcohols are produced from unsaturated hydrocarbons by treatment of materials, such as cracked gasolene, shale oil and the like, and containing unsaturated hydrocarbons, with an extracting agent for unsaturated hydrocarbons, such as sulfuric acid and the like, and hydrolysis of the acid extract or liquor obtained (as fully described in our co-pending application Serial No. 230679, filed April 25, 1918, to which reference is hereby made) the crude alcoholic materials produced are usually accompanied by hydrocarbons, principally unsaturated hydrocarbons, and also more or less saturated hydrocarbons may be present.

The process of this patent may be applied to the refinement of such alcoholic material by substantially effecting a separation between such alcoholic material and hydrocarbon material, or it may be applied to other mixtures of alcoholic materials and hydrocarbon materials and adapted to be separated in the manner described herein.

According to the present invention substantial separation between alcoholic materials and hydrocarbon materials which are admixed together, may be effected by incorporating such mixtures of alcohols and hydrocarbons with dilute sulfuric acid of proper strength.

Dilute sulfuric acid of about 1.57 sp. gr. is found to exert a selective solvent action on such mixtures, the alcohols being substantially soluble therein and the unsaturated hydrocarbons substantially insoluble therein. Any saturated hydrocarbon material present is, of course, insoluble in the sulfuric acid. The solution of alcohols may be freed from the insoluble hydrocarbon materials, and the alcohols recovered from the acid solution.

When alcoholic materials are derived from unsaturated hydrocarbons, as by extracting the unsaturated hydrocarbons with sulfuric acid in the sulfated form and entering into water and distilling, the alcohols and mixtures thereof which distil over may be separated to some extent from the proportion of hydrocarbon material, by which they are usually accompanied and which are principally mixtures of unsaturated hydrocarbons, by the ordinary procedure of fractional distillation.

The unsaturated hydrocarbons boil generally at lower points than the alcoholic material produced, and upon redistillation of the crude acoholic material, the lightest material coming over may consist almost entirely of unsaturated hydrocarbons with possibly small quantities of alcohols.

The higher boiling portions obtained from distilling the crude alcoholic material, while they may contain more or less unsaturated hydrocarbons, consist principally of alcohols which are usually of higher boiling points than the unsaturated hydrocarbons. Between the two there is usually a range in which the boiling points are close together or overlap, and mixtures of unsaturated hydrocarbons and alcohols are obtained in varying relative proportions. Separation by fractional distillation is difficult with such material, but such separation may be simply and readily effected in the following manner.

We have found that sulfuric acid diluted with water to about 1.57 sp. gr. dissolves or absorbs the alcohols produced from light cracked hydrocarbon material, such, for example, as a fraction of Burton oil boiling up to about 120° C., (the Burton oil being obtained by cracking heavy petroleum material at about 75 pounds pressure and condensing it under substantially still pressure, and thereafter redistilling at substantially atmospheric pressure) but the hydrocarbon materials are not dissolved or absorbed by the sulfuric acid to any considerable extent.

This characteristic solvent action may be utilized to effect a substantial separation between the alcohols and the hydrocarbon material. For example, in order to substantially purify the alcohols and remove or substantially remove hydrocarbon materials therefrom, sulfuric acid diluted with water to substantially 1.57 sp. gr. may be mixed with the alcohol-containing material and centrifuged or allowed to settle. The sulfuric acid, with the alcohols dissolved or absorbed thereby, may then be separated from hydrocarbons which form a layer at the top, and after effecting such separation and upon further diluting the solution of the alcohols in the sulfuric acid, as by adding water, the major portion of the alcohols being no longer soluble in the weak acid solution rise to the top and may be readily separated. Any remaining alcohols dissolved in the weak acid solution may be recovered as by fractional distillation. It should be noted that alcohols derived from unsaturated hydrocarbons are comparatively easily dehydrated, and in carrying out the refinement treatment described with such alcoholic material, the exposure of the alcoholic material to the acid over long intervals at high temperatures sufficient to cause dehydration of the alcohols is preferably to be avoided.

In the case of alcohols derived from unsaturated hydrocarbons as above referred to and accompanied by hydrocarbons, the mode of refining the alcohols by separation with sulfuric acid of about 1.57 sp. gr. is especially useful in the case where hydrocarbon material is present which boils within the range of boiling points of alcoholic material present. While this method of separation is preferably applied to the fraction of such crude alcoholic material intermediate between the fractions readily separable by fractional distillation, it may be applied to other parts thereof or to the entire crude distillate obtained from the hydrolyzing still, or it may be applied to other mixtures of alcoholic material with hydrocarbon material and other bodies not soluble in sulfuric acid of the specific gravity of about 1.57.

It will be seen that the process of the present invention affords a simple, rapid and easily applicable method of substantially refining alcoholic material and freeing it from admixed hydrocarbon material or other material not soluble in the dilute sulfuric acid, and that, while separation by selective solvent action of the dilute sulfuric acid in accordance with the present invention may not entirely replace refinement by other procedure, as, for example, by fractional distillation, it may be utilized to advantage either separately or in connection with other modes of refining treatment, as fractional distillation and the like. In our claims we have made use of the expression alcohol-solvent strength with reference to sulfuric acid to designate sulfuric acid of a strength in which the alcoholic material is soluble and the hydrocarbon material is insoluble; sulfuric acid of a strength corresponding to a specific gravity of about 1.57 has been found to give good results.

We claim:

1. The process of separating alcoholic material and hydrocarbon material which comprises incorporating a mixture of such materials with sulfuric acid of alcohol-solvent strength.

2. The process of separating alcoholic material and hydrocarbon material which comprises incorporating a mixture of such materials with dilute sulfuric acid of about 1.57 specific gravity in which the alcoholic material is soluble and the hydrocarbon material insoluble.

3. The process of separating alcoholic material from hydrocarbon material admixed therewith which comprises incorporating such mixture with sulfuric acid of alcohol solvent strength, freeing the soluble alcoholic material from the insoluble hydrocarbon material, and recovering the alcoholic material from the acid.

4. The process of separating alcoholic material from hydrocarbon material admixed therewith which comprises incorporating such mixture with diluted sulfuric acid of about 1.57 specific gravity in which the alcoholic material is substantially soluble and the hydrocarbon material substantially insoluble, freeing the solution of alcoholic material from the insoluble hydrocarbon material, and recovering the alcoholic material from the acid.

5. The process of separating unsaturated hydrocarbon material from a mixture thereof with alcoholic material derived from unsaturated hydrocarbons which comprises incorporating such mixture with diluted sulfuric acid of about 1.57 specific gravity in which the alcoholic material is substantially soluble and the hydrocarbon material substantially insoluble, freeing the solution of alcoholic material from the insoluble hydrocarbon material, and recovering the alcoholic material from the acid.

6. The process of freeing alcoholic material from unsaturated hydrocarbon material admixed therewith which comprises incorporating such mixture with sulfuric acid of about 1.57 specific gravity, freeing the solution of alcoholic material from the insoluble hydrocarbon material, diluting the alcoholic solution, and separating the alcoholic material from the weak acid.

7. The process of purifying crude alcoholic material which comprises incorporating the same with its impurities in sulfuric acid of about 1.57 specific gravity, freeing the solution of the alcoholic material in the acid of undissolved material and recovering the alcoholic material from the acid in substantially purified form.

8. The process of purifying alcoholic material derived from unsaturated hydrocarbons which comprises incorporating such material with sulfuric acid of about 1.57 specific gravity, freeing the solution of the alcoholic material in the acid of materials insoluble in the acid, diluting the alcoholic solution to substantially below 1.57 specific gravity, and separating the weak acid from the alcoholic material insoluble therein, and recovering any remaining alcoholic material by distillation of the weak acid.

In testimony that we claim the foregoing, we have hereto set our hands, this 23rd day of April, 1918.

CARLETON ELLIS.
MORTIMER J. COHEN.